(12) United States Patent
Quioc

(10) Patent No.: US 7,267,365 B2
(45) Date of Patent: Sep. 11, 2007

(54) INFLATOR

(75) Inventor: Eduardo L. Quioc, Westland, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/076,683

(22) Filed: Mar. 9, 2005

(65) Prior Publication Data

US 2005/0263994 A1 Dec. 1, 2005

Related U.S. Application Data

(60) Provisional application No. 60/551,966, filed on Mar. 10, 2004, provisional application No. 60/551,967, filed on Mar. 10, 2004.

(51) Int. Cl.
*B60R 21/26* (2006.01)

(52) U.S. Cl. .................. 280/736; 280/741; 280/742

(58) Field of Classification Search ............... 280/736, 280/740, 741, 742
See application file for complete search history.

(56) References Cited

U.S. PATENT DOCUMENTS 2,891,525 A 6/1959 Moore ............... 123/90.51

(Continued)

FOREIGN PATENT DOCUMENTS

DE 40 19 877 A1 6/1990

(Continued)

OTHER PUBLICATIONS

WO 98/39183; Title: Multi-Chamber Inflator; International Publication Date: Sep. 11, 1998; Inventors: Shahid A. Siddiqui and Rickey Lee Stratton; Applicant: Antomotive Systems Laboratory, Inc.

(Continued)

*Primary Examiner*—Paul N. Dickson
*Assistant Examiner*—Laura B. Freedman
(74) *Attorney, Agent, or Firm*—L.C. Begin & Associates, PLLC.

(57) ABSTRACT

An inflator for a vehicle occupant restraint system. The inflator includes a cylindrical outer wall having a longitudinal axis and a first opening formed therealong for enabling fluid communication between an interior of the inflator and an exterior of the inflator. A first inflation fluid source is positioned within the outer wall. A baffle system is fluidly interposed between the first inflation fluid source and the outer wall for conveying inflation fluid between the first inflation fluid source and the outer wall, and for cooling the inflation fluid. A second opening enables fluid communication between the first inflation fluid source and the baffle system, and a third opening enables fluid communication between the baffle system and the outer wall. The first opening is substantially radially aligned with the second opening. An expanded metal mesh buffer may be positioned between within the baffle system. Openings enabling fluid communication between the baffle system and the exterior of the baffle system, any openings provided within the baffle system, and the opening enabling fluid communication between the interior and exterior of the inflator housing are cooperatively positioned to direct the flow of an inflation through the baffle system in directions substantially perpendicular to and/or substantially parallel to the longitudinal axis. Also disclosed is a vehicle occupant restraint system incorporating an inflator in accordance with the present invention.

11 Claims, 6 Drawing Sheets

U.S. PATENT DOCUMENTS

| | | | | |
|---|---|---|---|---|
| 3,794,347 | A | 2/1974 | Zens | 280/150 |
| 3,877,882 | A | 4/1975 | Lette et al. | |
| 3,880,447 | A | 4/1975 | Thorn et al. | |
| 3,958,949 | A | 5/1976 | Plantif et al. | |
| 3,985,076 | A | 10/1976 | Schneiter et al. | |
| 4,001,750 | A | 1/1977 | Scherer et al. | 337/280 |
| 4,012,189 | A | 3/1977 | Vogt et al. | 431/353 |
| 4,215,631 | A | 8/1980 | Rucker | 102/27 |
| 4,530,516 | A | 7/1985 | Adams et al. | 280/741 |
| 4,611,374 | A | 9/1986 | Schnelle et al. | 29/890.13 |
| 4,722,551 | A * | 2/1988 | Adams | 280/736 |
| 4,730,558 | A | 3/1988 | Florin et al. | 102/218 |
| 4,762,067 | A | 8/1988 | Barker et al. | 102/313 |
| 4,886,293 | A * | 12/1989 | Weiler et al. | 280/736 |
| 4,950,458 | A | 8/1990 | Cunningham | 422/164 |
| 5,028,070 | A | 7/1991 | Bender | |
| 5,048,862 | A | 9/1991 | Bender et al. | |
| 5,215,721 | A * | 6/1993 | Tasaki et al. | 422/165 |
| 5,318,323 | A | 6/1994 | Pietz | |
| 5,333,656 | A | 8/1994 | Mackal | 141/330 |
| 5,340,150 | A * | 8/1994 | Harada et al. | 280/740 |
| 5,372,449 | A | 12/1994 | Bauer et al. | 403/273 |
| 5,387,009 | A | 2/1995 | Lauritzen et al. | |
| 5,406,889 | A * | 4/1995 | Letendre et al. | 102/201 |
| 5,443,286 | A | 8/1995 | Cunningham et al. | |
| 5,466,420 | A * | 11/1995 | Parker et al. | 422/164 |
| 5,509,686 | A | 4/1996 | Shepherd et al. | 280/738 |
| 5,516,147 | A | 5/1996 | Clark et al. | 280/737 |
| 5,533,751 | A | 7/1996 | Kort et al. | 280/737 |
| 5,562,304 | A | 10/1996 | Gest | |
| 5,564,743 | A | 10/1996 | Marchant | 280/741 |
| 5,582,427 | A | 12/1996 | Rink et al. | 280/740 |
| 5,588,676 | A | 12/1996 | Clark et al. | 280/741 |
| 5,611,566 | A | 3/1997 | Simon et al. | 280/736 |
| 5,613,703 | A | 3/1997 | Fischer | 280/741 |
| 5,622,380 | A | 4/1997 | Khandhadia et al. | 280/736 |
| 5,624,133 | A | 4/1997 | Wong | |
| 5,624,134 | A * | 4/1997 | Iwai et al. | 280/741 |
| 5,628,528 | A * | 5/1997 | DeSautelle et al. | 280/736 |
| 5,630,619 | A | 5/1997 | Buchanan et al. | 280/741 |
| 5,662,722 | A | 9/1997 | Shiban | 55/413 |
| 5,725,245 | A | 3/1998 | O'Driscoll et al. | |
| 5,799,973 | A | 9/1998 | Bauer et al. | 280/741 |
| 5,813,695 | A | 9/1998 | O'Driscoll et al. | |
| 5,845,935 | A | 12/1998 | Enders et al. | 280/743.2 |
| 5,860,672 | A | 1/1999 | Petersen | 280/728.2 |
| 5,872,329 | A | 2/1999 | Burns et al. | 149/36 |
| 5,934,705 | A | 8/1999 | Siddiqui et al. | 280/736 |
| 5,941,562 | A | 8/1999 | Rink et al. | 280/741 |
| 5,970,880 | A | 10/1999 | Perotto | 102/531 |
| 6,019,389 | A | 2/2000 | Burgi et al. | 280/736 |
| 6,032,979 | A | 3/2000 | Mossi et al. | 280/741 |
| 6,074,502 | A * | 6/2000 | Burns et al. | 149/36 |
| 6,095,556 | A | 8/2000 | Bailey et al. | 280/737 |
| 6,095,559 | A | 8/2000 | Smith et al. | |
| 6,095,561 | A | 8/2000 | Siddiqui et al. | 280/472 |
| 6,106,000 | A | 8/2000 | Stewart | 280/728.2 |
| 6,116,491 | A | 9/2000 | Kutoh | 228/42 |
| 6,149,193 | A | 11/2000 | Canterberry et al. | 280/741 |
| 6,210,505 | B1 | 4/2001 | Khandhadia et al. | 149/36 |
| 6,244,623 | B1 | 6/2001 | Moore et al. | 280/741 |
| 6,379,627 | B1 | 4/2002 | Nguyen et al. | |
| 6,464,254 | B2 | 10/2002 | Chikaraishi et al. | 280/741 |
| 6,474,684 | B1 * | 11/2002 | Ludwig et al. | 280/741 |
| 6,485,051 | B1 * | 11/2002 | Taguchi et al. | 280/736 |
| 6,709,012 | B1 * | 3/2004 | Tanaka et al. | 280/736 |
| 6,764,096 | B2 * | 7/2004 | Quioc | 280/736 |
| 6,776,434 | B2 | 8/2004 | Ford et al. | 280/729 |
| 6,851,705 | B2 | 2/2005 | Young et al. | |
| 6,908,104 | B2 | 6/2005 | Canterberry et al. | 280/736 |
| 6,929,284 | B1 * | 8/2005 | Saso et al. | 280/741 |
| 6,935,655 | B2 | 8/2005 | Longhurst et al. | 280/736 |
| 6,945,561 | B2 * | 9/2005 | Nakashima et al. | 280/736 |
| 6,948,737 | B2 * | 9/2005 | Ohji et al. | 280/736 |
| 6,976,702 | B2 | 12/2005 | Yakota et al. | 280/730.2 |
| 7,073,820 | B2 | 7/2006 | McCormick | 280/741 |
| 2002/0053789 | A1 | 5/2002 | Fujimoto | |
| 2003/0127840 | A1 | 7/2003 | Nakashima et al. | |
| 2003/0155757 | A1 | 8/2003 | Larsen et al. | |
| 2003/0201628 | A1 | 10/2003 | Choudhury et al. | 280/729 |
| 2004/0046373 | A1 | 3/2004 | Wang et al. | |
| 2005/0001414 | A1 | 1/2005 | Matsuda et al. | 280/736 |
| 2005/0134031 | A1 | 6/2005 | McCormick | |
| 2005/0161925 | A1 | 7/2005 | Blackburn | |
| 2005/0194772 | A1 | 9/2005 | Nomoto et al. | 280/741 |
| 2005/0230949 | A1 | 10/2005 | Blackburn | |
| 2005/0263993 | A1 | 12/2005 | Blackburn | |
| 2005/0263994 | A1 | 12/2005 | Quioc | 280/741 |
| 2005/0280252 | A1 | 12/2005 | McCormick | |
| 2006/0005734 | A1 | 1/2006 | McCormick | |
| 2006/0043716 | A1 | 3/2006 | Quioc | |
| 2006/0082112 | A1 | 4/2006 | Blackburn | 280/736 |

FOREIGN PATENT DOCUMENTS

| | | |
|---|---|---|
| DE | 42 27 547 A1 | 2/1994 |
| EP | 0602785 B1 | 10/1993 |
| EP | 0728633 A1 | 2/1996 |
| EP | 0844149 A1 | 11/1997 |
| EP | 0 864 470 A1 | 9/1998 |
| EP | 1122134 B1 | 7/2000 |
| EP | 1308353 A2 | 9/2002 |
| JP | 04055151 A * | 2/1992 |
| JP | 05096147 | 4/1993 |
| JP | 05178155 A * | 7/1993 |
| JP | 05178156 A * | 7/1993 |
| JP | 06227358 A * | 8/1994 |
| WO | WO98/39183 | 9/1998 |
| WO | WO 2004/091982 A1 | 10/2004 |
| WO | WO 2005/058645 A2 | 6/2005 |
| WO | WO 2005/086917 | 9/2005 |
| WO | WO 2006/044516 A2 | 4/2006 |
| WO | WO 2006/078819 A2 | 7/2006 |

OTHER PUBLICATIONS

U.S. Appl. No. 11/251,255.
U.S. Appl. No. 11/358,786.

* cited by examiner

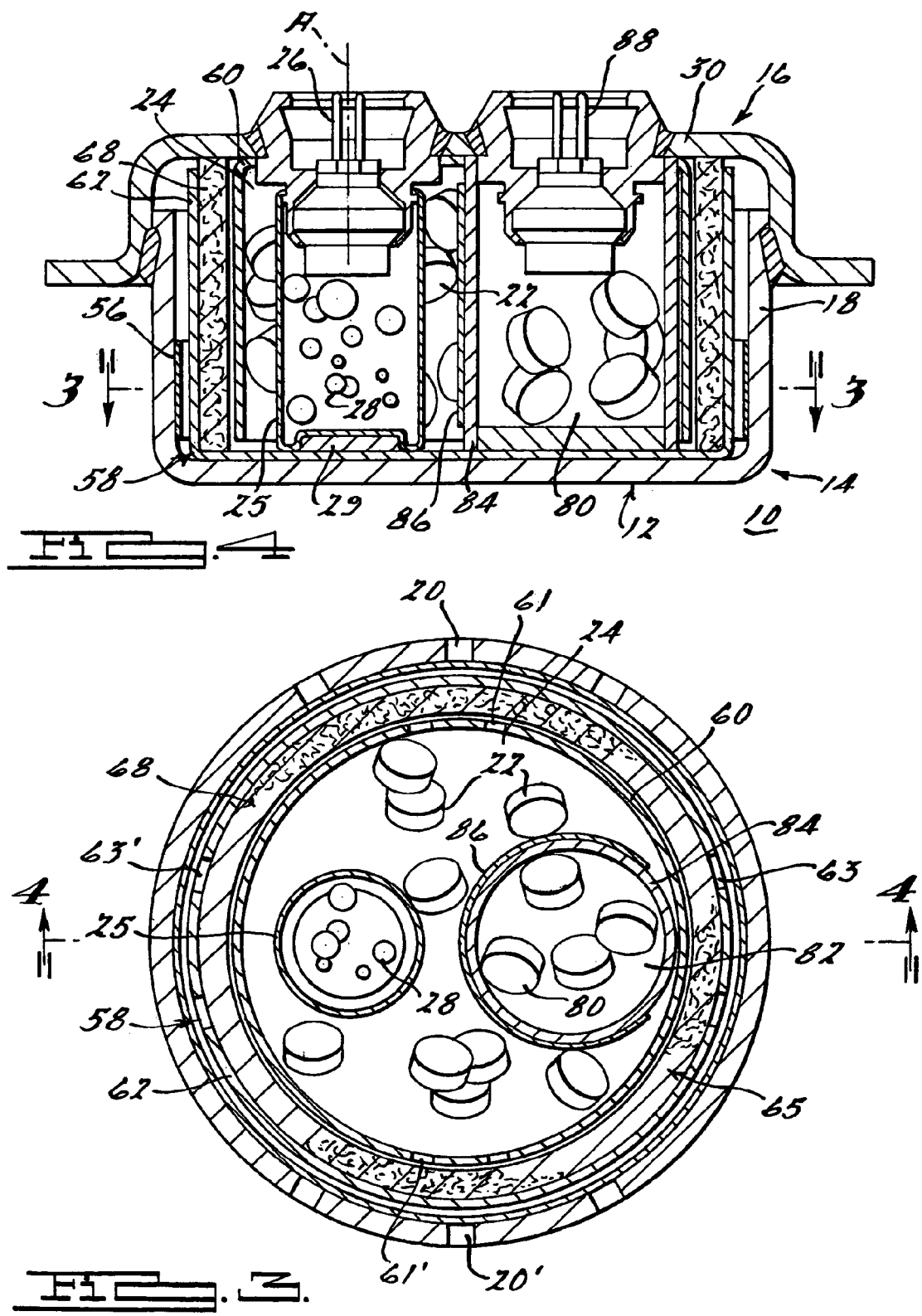

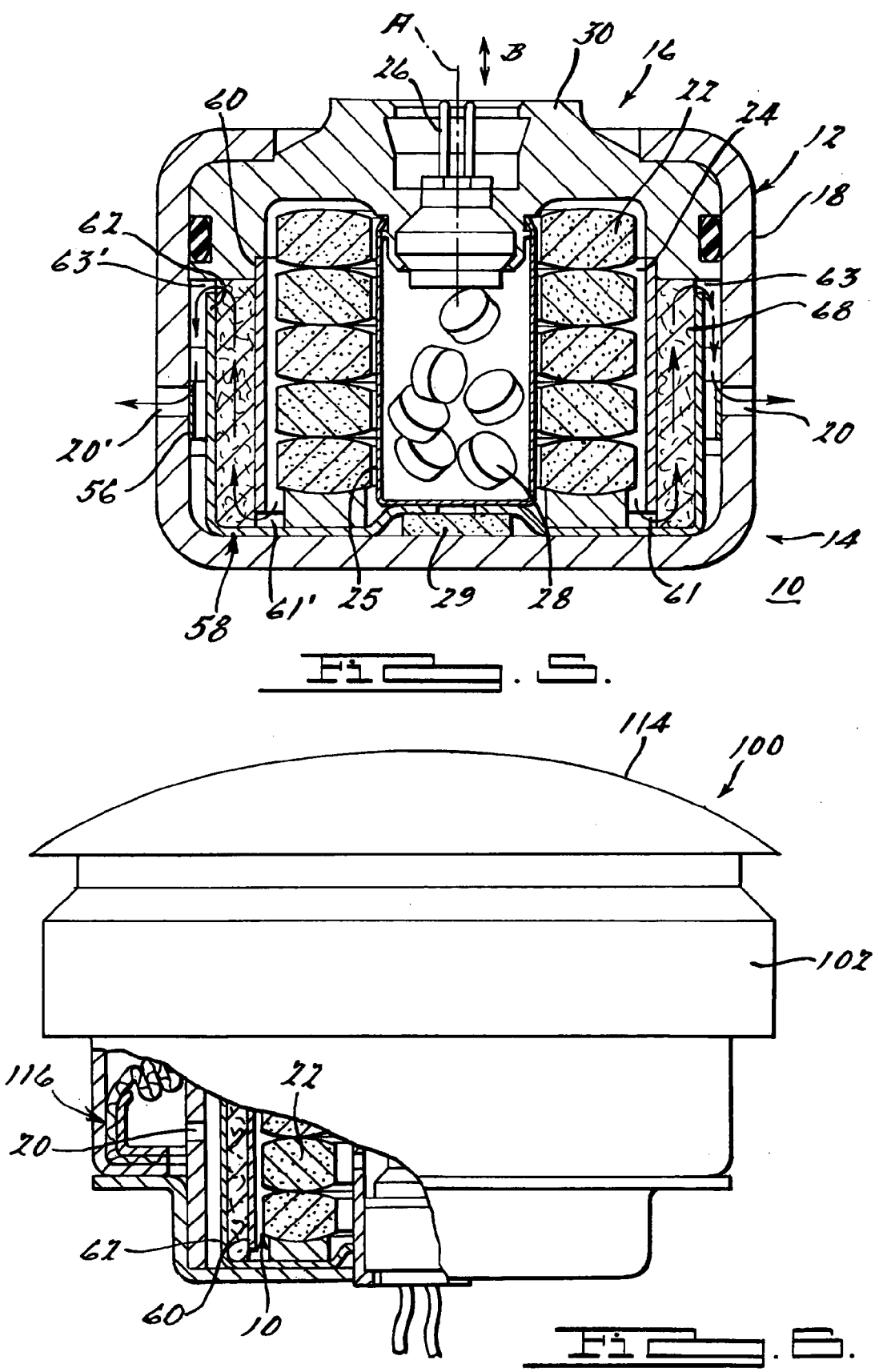

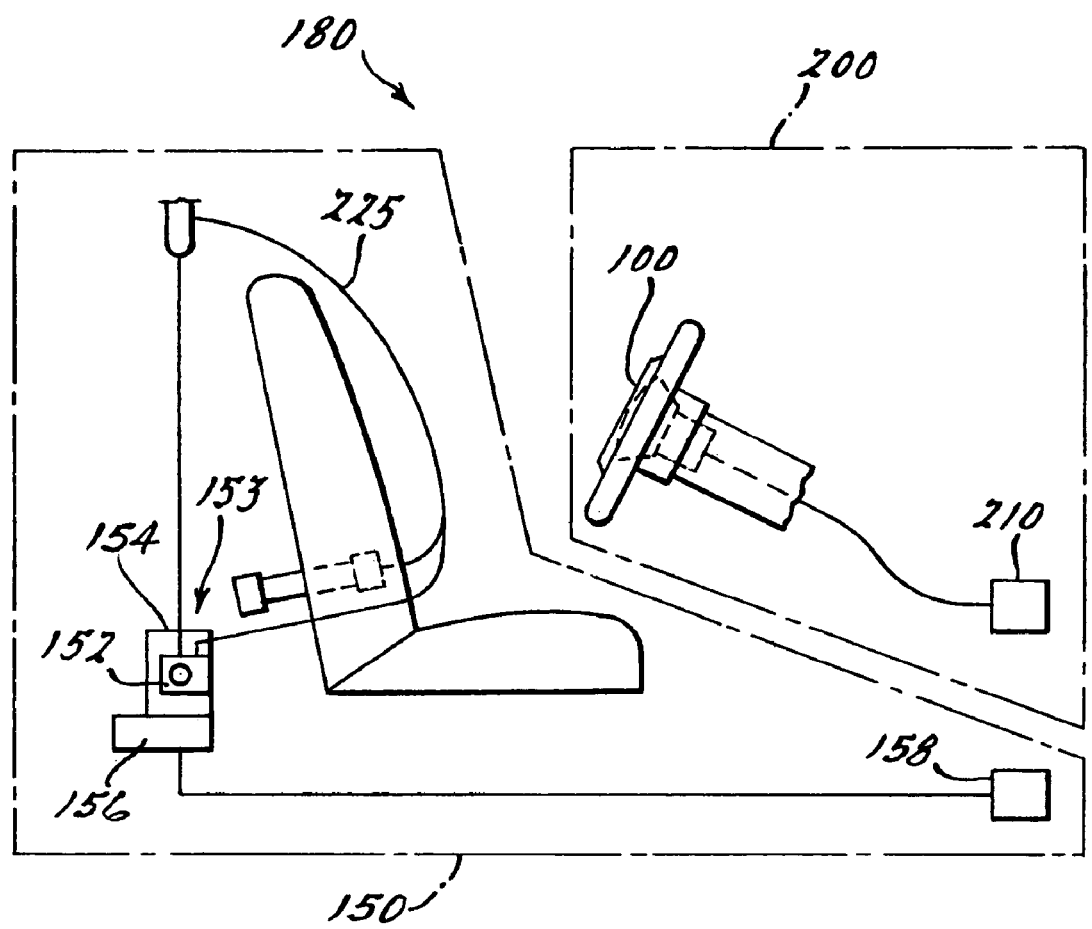

_US 7,267,365 B2_

INFLATOR

CROSS REFERENCE TO RELATED APPLICATIONS

This application claims the benefit of provisional application Ser. Nos. 60/551,966 filed on Mar. 10, 2004 and 60/551,967 filed Mar. 10, 2004.

TECHNICAL FIELD

The present invention relates generally to gas generators or inflators for use in inflatable occupant restraint systems in motor vehicles, and more particularly to such a device that is a filterless inflator.

BACKGROUND OF THE INVENTION

Installation of inflatable occupant restraint systems, generally known as "airbags," as standard equipment in all new vehicles has intensified the search for smaller, lighter and less expensive restraint systems. Accordingly, since the inflator used in such systems tends to be the heaviest and most expensive component, there is a need for a lighter and less expensive inflator.

A typical inflator includes a cylindrical steel or aluminum housing having a diameter and length related to the vehicle application whereby the propellant is contained therein. The inflator is generally provided with an internal filter comprising one or more layers of steel screen of varying mesh and wire diameter. Gas produced upon combustion of the propellant passes through the filter before exiting the inflator. Particulate material, or slag, produced during combustion of the propellant in a conventional system is substantially removed as the gas passes through the filter.

Much research and development in gas generant technology has been devoted to reducing the smoke, soot and other particulates produced during combustion. Inhalation of the particulates by a vehicle occupant after airbag activation can be hazardous. Various gas generant formulations and inflator design have been developed in which the particulates resulting from combustion of the gas generant are substantially eliminated or significantly reduced.

Nevertheless, certain types of propellants are still desirable notwithstanding the relatively high percent of combustion solids produced, given favorable characteristics such as burn rate, sustained combustion, and repeatability of performance.

SUMMARY OF THE INVENTION

The solution to the problem of reducing airbag inflator size, weight, and cost, and optimizing efficiency, in accordance with the present invention, is predicated on the concept that it is possible to obviate the need for a filter by instead providing a baffle system that routes the gases for cooling and slag deposition throughout an associated flow buffer.

The present invention provides an inflator for a vehicle occupant restraint system. The inflator includes a cylindrical outer wall having a longitudinal axis and a first opening formed therealong for enabling fluid communication between an interior of the inflator and an exterior of the inflator. A first inflation fluid source or at least one inflation fluid source is positioned within the outer wall. A baffle system is intermediate of or fluidly interposed between the first inflation fluid source and the outer wall for conveying inflation fluid between the first inflation fluid source and the outer wall, and for cooling the inflation fluid. A second opening enables fluid communication between the first inflation fluid source and the baffle system, and a third opening enables fluid communication between the baffle system and the outer wall. The first opening facilitates overall radial flow from the second opening along the inner baffle.

In a first embodiment, the baffle system includes an inner baffle and an outer baffle concentrically arranged about the outer wall longitudinal axis to form a plenum therebetween. In addition, the outer baffle is positioned radially inward of the housing outer wall to form a plenum extending between the outer wall and the outer baffle. An expanded metal mesh buffer may be positioned in the plenum between the inner and outer baffles. Openings enabling fluid communication between the baffle system and the exterior of the baffle system, any openings provided within the baffle system, and the opening enabling fluid communication between the interior and exterior of the inflator housing are cooperatively positioned to direct the flow of an inflation through the baffle system in directions substantially parallel to a plane perpendicular to the longitudinal axis and/or substantially parallel to the longitudinal axis.

In another aspect of the invention, a vehicle occupant restraint system is provided incorporating an inflator in accordance with the present invention.

It is believed that the advantages attendant to the inflator formed in accordance with the present invention will translate into similar benefits with regard to the airbag module and with regard to the vehicle occupant restraint system in general. These advantages include, for example, lower gas exit temperatures, manufacturing simplicity, lighter weight, reduced manufacturing cost, simplified assembly, and tailorability of the inflation profile of an associated airbag.

It is also believed that the patterns of circumferential and/or longitudinal fluid flow established by the relative positioning of gas flow openings formed in the inflator components will provide a predetermined degree of cooling of the inflation fluid. By appropriate modification of such factors as the relative gas flow opening locations and the number of baffles used, the degree of fluid cooling may be correspondingly adjusted to meet the cooling requirements of a particular application.

BRIEF DESCRIPTION OF THE DRAWINGS

FIG. 3 is a cross-sectional plan view of a second embodiment of an inflator in accordance with the present invention;

FIG. 4 is a cross-sectional side view of the inflator of FIG. 3 taken along line 4-4 of FIG. 3;

FIG. 5 is a cross-sectional side view of a third embodiment of an inflator in accordance with the present invention;

FIG. 6 is a view of an airbag module employing an inflator constructed in accordance with the present invention; and FIG. 7 is a schematic representation of an exemplary vehicle occupant restraint system incorporating an inflator in accordance with the present invention.

DETAILED DESCRIPTION OF PREFERRED EMBODIMENTS

The present invention broadly comprises a gas generator or inflator that is formed without the wire mesh filter required in earlier designs for removing particulate materials from the stream of inflation gas upon combustion. A baffle/buffer system is therefore employed in place of the filter whereby upon gas generant combustion, slag is formed within the buffer system and gases are also cooled therein. Selection of suitable gas generant compositions capable of combusting to produce inflation gas without an undue quantity of particulates further obviates the need for a conventional filter. Obviating the need for a filter in an inflator allows the devices to be simpler, lighter, less expensive and easier to manufacture. Although the preferred embodiment of the present invention does not contain a filter, a filter formed by known or otherwise suitable methods may be included if desired. All of the component parts of the present invention are known in the art or manufactured by known processes.

Figure 1:
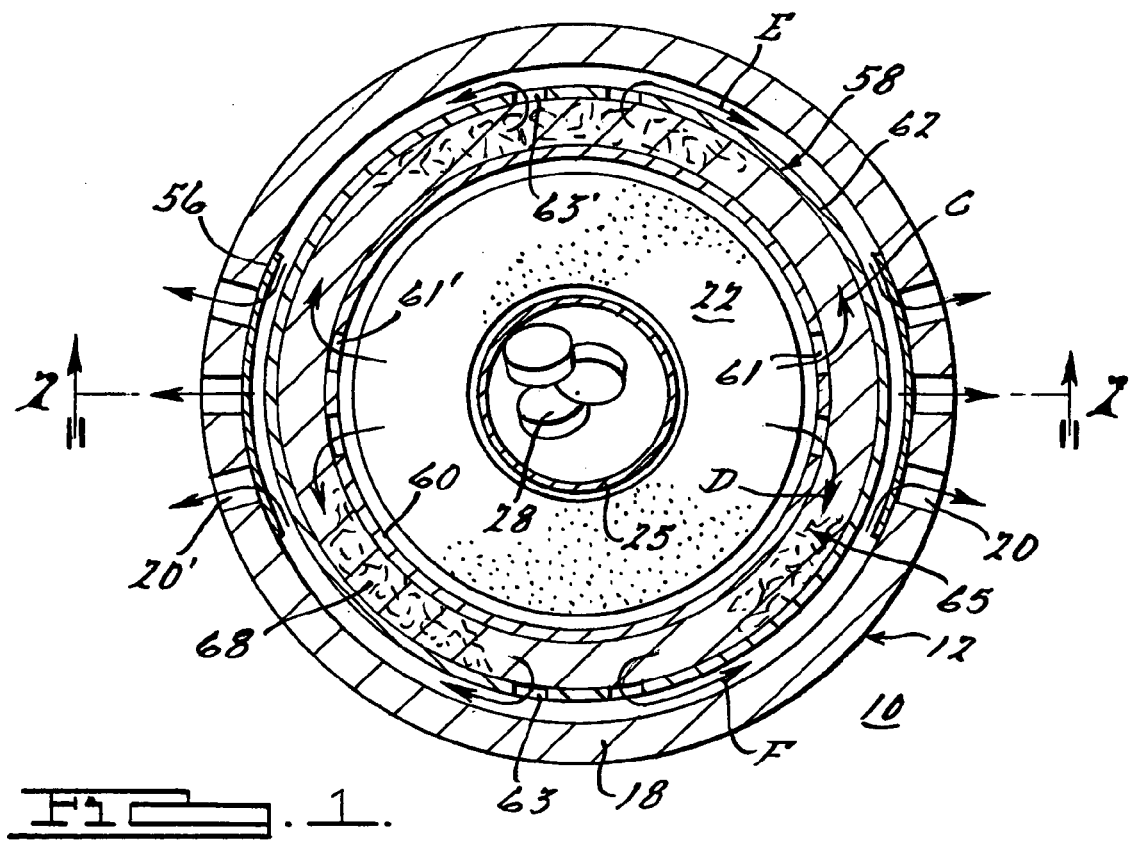
FIG. 1 is a cross-sectional plan view of a first embodiment of an inflator in accordance with the present invention.
Figure 2:
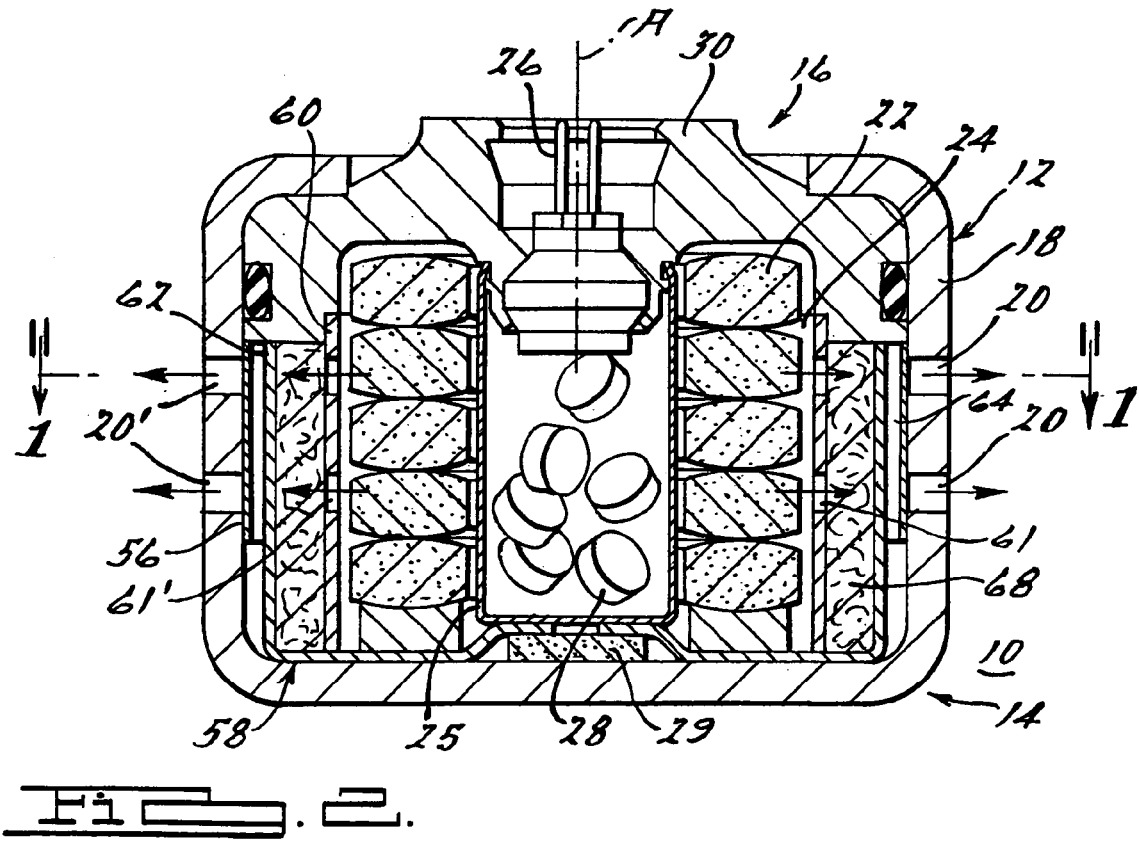
FIG. 2 is a cross-sectional side view of the inflator of FIG. 1 taken along line 2-2 of FIG. 1.

FIGS. 1 and 2 show a cross-sectional view of a first embodiment of an inflator 10 in accordance with the present invention. Inflator 10 is preferably constructed of components made from durable metals such as carbon steel or iron, but may also include components made from tough and impact-resistant polymers, for example. One of ordinary skill in the art will appreciate various methods of construction for the various components of the inflator. U.S. Pat. Nos. 5,035,757, 6,062,143, 6,347,566, U.S. patent application Ser. No. 2001/0045735, WO 01/08936, and WO 01/08937 exemplify typical designs for the various inflator components, and are incorporated herein by reference in their entirety, but not by way of limitation.

Referring to FIGS. 1 and 2, inflator 10 includes a generally cylindrical housing 12 having a closed end 14, an open end 16, and an outer wall 18 extending along a longitudinal axis "A". Housing 12 may be cast, stamped, extruded, or otherwise metal-formed. At least one and, preferably, a plurality of openings 20 are formed along housing wall 18 to permit fluid communication between an interior of the inflator and an airbag (not shown). In addition, in the embodiment shown in FIGS. 1 and 2, at least one and, preferably, a plurality of openings 20' are formed along inflator outer wall 18 substantially diametrically opposite openings 20 formed along the outer wall.

Openings 20 may be covered with a foil 56 such as aluminum or stainless steel foil to prevent the incursion of water vapor into inflator housing 12. The foil 56, sometimes referred to as "burst foil" is typically of a thickness of from 0.01 to about 0.20 mm. The foil 56 is typically adhered to an interior surface of the inflator housing through the use of an adhesive.

An inflator housing closure 30 is crimped, welded, or otherwise fixed to open end 16 of housing 12. Closure 30 may be cast, stamped, or otherwise metal-formed. Alternatively, closure 30 may be molded from a suitable high temperature-resistant polymer.

Inflator 10 also includes a first inflation fluid source positioned within the outer wall for releasably storing, generating, or otherwise providing an inflation fluid for inflating an inflatable element (for example, an airbag) of a vehicle occupant restraint system. In the embodiment shown in FIGS. 1 and 2, the first inflation fluid source comprises a gas generant composition 22 positioned within a combustion chamber 24 defined by a first baffle 60 (described in greater detail below) and end closure 30.

Other inflation fluids sources are contemplated for use in the present invention. For example, in an alternative embodiment (not shown), a vessel containing a pressurized gas may be positioned within housing 12 for use as an inflation fluid source.

Gas generant 22 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232 and 6,475,312 each incorporated by reference herein. Other suitable compositions are set forth in the U.S. patent application Ser. Nos. 10/407,300 and 60/369,775, incorporated by reference herein. As used herein, the term "smokeless" should be generally understood to mean such propellants as are capable of combustion yielding at least about 90% gaseous products based on a total product mass; and, as a corollary, less than about 10% solid products based on a total product mass. It has been generally found that filters as used in other inflator designs can be eliminated by using compositions having the described combustion characteristics.

An igniter 26 is secured to inflator 10 so as to enable fluid communication with such that the igniter is in communication with the interior of gas generant 22, for igniting the gas generant upon occurrence of a crash event. In the embodiment shown in FIGS. 1 and 2, igniter 26 is positioned and secured within an annular bore of housing closure 30 using known methods. In an alternative embodiment (not shown), a perforated igniter support tube may be welded or otherwise fixed within housing 12 to support igniter 26. The perforated support tube allows a flame front generated by igniter 26 to pass to gas generant 22, thereby igniting the gas generant and producing an inflating gas. Igniter 26 may be formed as known in the art. One exemplary igniter construction is described in U.S. Pat. No. 6,009,809, herein incorporated by reference.

Referring to FIGS. 1 and 2, a quantity of a known booster propellant 28 may be positioned within inflator housing 12 so as to enable fluid communication between the booster propellant and gas generant composition 22 upon activation of the inflator. A cup 25 may be positioned within the inflator housing to enclose igniter 26 and to house booster propellant 28. Cup 25 may be stamped, extruded, die cast, or otherwise metal formed and may be made from carbon steel, stainless steel, or any other thermally conductive metal or metal alloy. Booster propellant 28 may be positioned in cup 25 to facilitate combustion of gas generant 22, in a manner known in the art. Activation of igniter 26 produces combustion of the booster propellant, thereby effecting ignition of gas generant composition 22 in a manner known in the art. In addition, a cavity may be formed in an end surface of the booster cup for accommodating a quantity of a heat-activated auto-ignition compound 29.

A quantity of a known auto-ignition compound 29 may be positioned within the inflator so as to enable fluid communication between gas generant 22 and the auto-ignition compound upon activation of the inflator. In a manner known in the art, ignition of gas generant 2 is produced by ignition of auto-ignition material 29 resulting from heat from combustion of booster propellant 28. Auto ignition material 29 is a pyrotechnic material which is ignited by exposure to a temperature lower than the ignition temperature of gas generant 22. Auto-ignition material 29 produces a hot gas/particulate effluent when ignited. Suitable auto ignition materials are known to those skilled in the art. Examples of suitable auto-ignition materials are nitro-cellulose based compositions and gun powder. Alternatively, combustion of gas generant 22 may be initiated by combustion of booster propellant 28 without the use of an auto-ignition material.

Referring again to FIGS. 1 and 2, the inflator of the present invention employs a baffle system, generally designated 58 for conveying inflation fluid between combustion chamber 24 and inflator outer wall 18, and for cooling inflation gases flowing therethrough. Baffle system 58 is fluidly interposed between gas generant composition 22 and inflator outer wall 18 (i.e., baffle system 58 is configured such that inflation fluid generated by combustion of gas generant 22 passes through the baffle system in order to reach inflator outer wall 18.)

Referring to FIGS. 1 and 2, in a first embodiment, baffle system 58 includes an inner baffle 60 and an outer baffle 62, both of baffles 60 and 62 being substantially concentrically arranged about longitudinal axis A.

Outer baffle 62 is positioned radially inwardly of outer wall 18 and in fluid communication with the outer wall, thereby forming a plenum 64 extending between outer baffle 62 and housing outer wall 18. Inner baffle 60 is positioned radially inwardly of outer baffle 62 so as to enable fluid communication between gas generant 22 and the inner baffle. In the embodiment shown, inner baffle 60 defines combustion chamber 24 containing gas generant 22. Inner baffle 60 also includes at least one opening 61 formed therealong, and at least one opening 61' formed substantially diametrically opposite opening 61, for enabling fluid communication between the gas generant 22 and the baffle system. In the embodiments of the baffle system disclosed herein, opening(s) 61, 61' for enabling fluid communication between the first inflation fluid source and the baffle system are substantially radially aligned with respective opening(s) 20, 20' in housing outer wall 18.

Outer baffle 62 also has at least one opening 63 and at least one opening 63' formed substantially diametrically opposite opening 63, for enabling fluid communication between the baffle system and inflator outer wall. In the embodiments shown in FIGS. 1-4, openings 63, 63' formed along outer baffle 62 are angularly spaced apart approximately 90° from respective ones of openings 61 and 61' formed along inner baffle 60. It should be emphasized that the apertures may be formed along inner baffle 60 and outer baffle 62 at the positions described, or they may be formed at other positions, thereby altering the pressurized fluid flow and also the time of migration through the two baffles.

Baffles 60 and 62 may be extruded or roll-formed or otherwise metal formed, and may be made from aluminum or stainless steel, for example. Each baffle may be pierced to accommodate the orientation of the various openings described above.

In alternative embodiments (not shown), openings are not provided along baffles 60 and/or 62 to enable fluid communication with an exterior of the baffle system. Rather, end portions of the baffles are spaced apart from the housing to provide a gap between the baffle and the housing through which inflation gases may migrate.

In the embodiment shown in FIGS. 1 and 2, outer baffle 62 is arranged substantially concentrically with inner baffle 60 about longitudinal axis A to form a plenum 65 between the two baffles, which facilitates gas fluid flow from inner baffle 60 to outer baffle 62.

In alternative embodiments (not shown), additional baffles may be incorporated within baffle system 58, in accordance with inflation gas cooling and flow requirements and inflator housing space limitations. However, openings 61, 61' and 63, 63' enabling fluid communication between the baffle system and the exterior of the baffle system, any openings provided along baffles (not shown) positioned between the inner and outer baffles, and the opening(s) 20, 20' enabling fluid communication between the interior and exterior of the inflator housing are substantially parallel to a plane perpendicular to the longitudinal axis and/or substantially parallel to the longitudinal axis.

Referring again to FIGS. 1 and 2, a buffer 68 is positioned between inner baffle 60 and outer baffle 62 for attenuating the high pressure inflation gas flow as it migrates through the baffle system. Buffer 68 may be formed from expanded metal mesh, for example.

FIGS. 3 and 4 show an alternative embodiment of the inflator. In FIGS. 3 and 4, like numerals are used to identify features similar to those identified in FIGS. 1 and 2.

Referring to FIGS. 3 and 4, in an alternative embodiment, inflator 10 may include a second inflation fluid source positioned within inflator outer wall 18 in fluid isolation from the first inflation fluid source. The second inflation fluid source is also positioned such that baffle system 58 is fluidly interposed between the second inflation fluid source and inflator outer wall 18.

In the embodiment shown in FIGS. 3 and 4, the second inflation fluid source comprises a second gas generant composition 80 positioned within a combustion chamber 82 defined by a shell 84. Shell 84 may be formed from a metal or metal alloy. Similar to gas generant 20 described above, second gas generant 80 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232 and 6,475,312 each incorporated by reference herein. Other suitable compositions are set forth in the U.S. patent application Ser. Nos. 10/407,300 and 60/369,775, incorporated by reference herein.

A barrier 86 may be provided for fluidly isolating second gas generant 80 from first gas generant 22. Barrier 86 prevents sympathetic ignition of second gas generant 80 in response to ignition of first gas generant 22, by preventing flame and combustion products from combustion of the first gas generant from reaching the second gas generant. Barrier 86 is constructed and positioned along an exterior surface of shell 84 and is configured so as to be pierced, detached from shell 84, or otherwise perforated or destroyed by pressure resulting from ignition of second gas generant 80, to permit release of inflation gas from shell 84 into baffle system 58 upon ignition of the second gas generant. Barrier 86 may be formed from a sheet of high-temperature resistant metal or metal alloy.

A second igniter 88 is secured to inflator 10 so as to enable fluid communication with second gas generant 80 upon activation of the second igniter. In the embodiment shown in FIG. 1, second igniter 88 is positioned and secured within a bore of housing closure 30 using known methods. In an alternative embodiment (not shown), a perforated igniter support tube (not shown) may be welded or otherwise fixed within housing 12 to support second igniter 88. The perforated support tube allows a flame front generated by second igniter 88 to pass to gas generant 80, thereby igniting the gas generant and producing an inflating gas. In this alternative embodiment, shell 84 forms a second combustion chamber 82 for containment of second gas generant 80. Second igniter 88 may be formed as known in the art. One exemplary igniter construction is described in U.S. Pat. No. 6,009,809, herein incorporated by reference. If desired, second igniter 88 may be simultaneously or subsequently ignited with first igniter 26, thereby producing additional inflation gases from second gas generant 80.

Referring to FIG. 5, a particular embodiment of the inflator features bidirectional fluid flow through the baffle system substantially parallel to longitudinal axis A, along the directions indicated by arrow B. In the embodiment shown, inner baffle 60 preferably includes one or more gas transfer openings 61 spaced about the circumference of the inner baffle and juxtaposed near housing closure 30. Outer baffle 62 preferably contains one or more gas transfer openings 63 spaced about the circumference of the second baffle and juxtaposed near closed end 14 of housing 12.

As in the embodiments previously described, an expanded metal mesh or buffer 68 occupies a plenum 65 formed between the inner and outer baffles, thereby functioning to cool the gases and also buffer the high pressure flow of the combustion gases. Also, in the embodiment shown in FIG. 2, opening 63 for enabling fluid communication between baffle system 58 and outer wall 18 is substantially radially aligned with opening 61 for enabling fluid communication between first gas generant 22 and baffle system 58, and opening 61 is also substantially radially aligned with opening 20 in outer wall 18. Similarly, opening 63' for enabling fluid communication between baffle system 58 and outer wall 18 is substantially radially aligned with opening 61' for enabling fluid communication between first gas generant 22 and baffle system 58, and opening 61' is also substantially radially aligned with opening 20' in outer wall 18.

Figure 8:
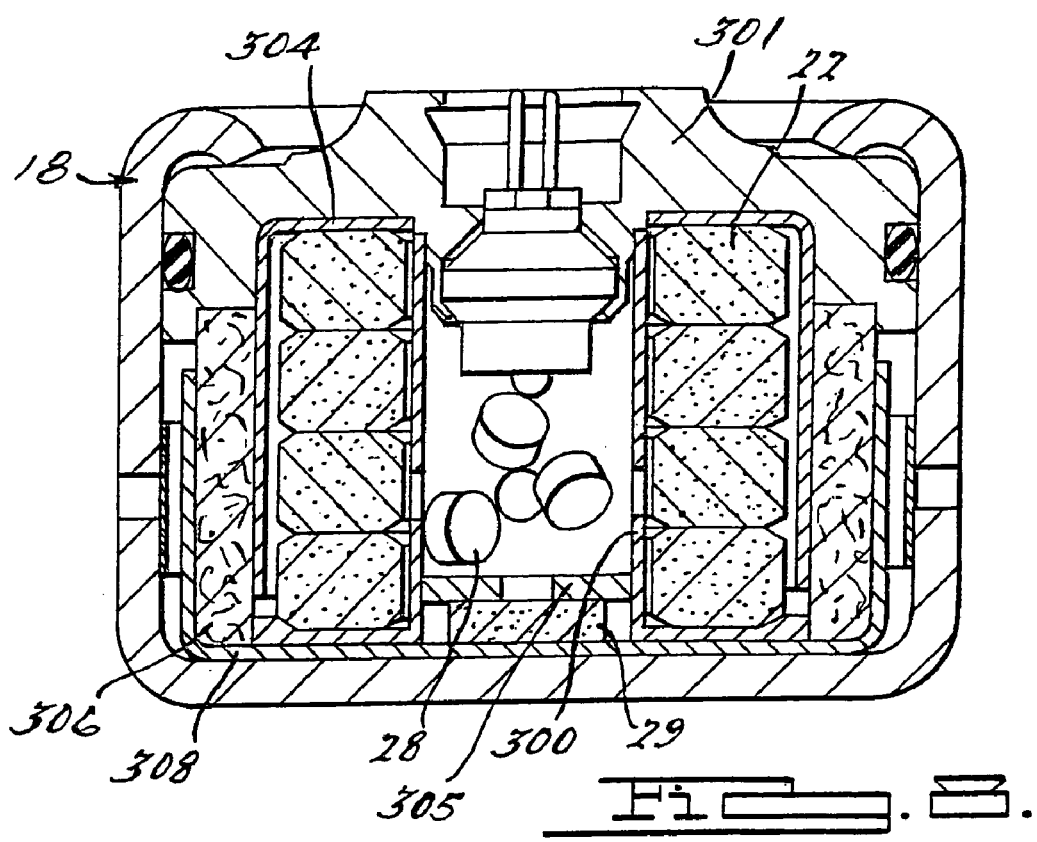
FIG. 8 is another embodiment of the present invention.

In yet another embodiment shown in FIG. 8, a perforated booster tube 300 is integrated into a structure otherwise very much like that shown in FIG. 5. The booster tube 300 is press fit about the igniter and extends longitudinally from the body bore seal toward the housing 18 bottom thereby encapsulating the autoignition compound 29. A perforated cross member 302 provides fluid communication between the ignition chamber and the autoignition compound upon activation thereof. Accordingly, upon inflator actuation, ignition products flow radially outward into the propellant 22 thereby igniting the same. Upon combustion of propellant 22, gases formed flow radially around the inner baffle and axially up through the inner baffle plenum, then radially over the outer baffle wall and axially through the outer baffle plenum, and then radially through the housing or outer wall. It will be appreciated that as shown in the drawings, a relatively smaller number of welds are needed to assemble the inflator assembly thereby simplifying the manufacturing process.

To assemble the inflator of FIG. 8, an igniter is crimped within the body bore seal. An annular inner baffle wall 304 is then press fit over the igniter and against the body bore seal 301 thereby forming the inner baffle. The perforated booster tube 300 is then press fit over the crimped igniter. Booster compound 28 is then placed within booster tube 300. A perforate booster tube cap 305 is then press fit over the booster tube 300 to contain the same. Autoignition compound 29 is then placed adjacent the cap 305. An annular filter 306 is then press fit over inner baffle wall 304. An outer baffle 308 is then press fit over the filter 306. The outer housing is then press fit over the outer baffle wall 308 and then laser welded to the base.

Figure 9:
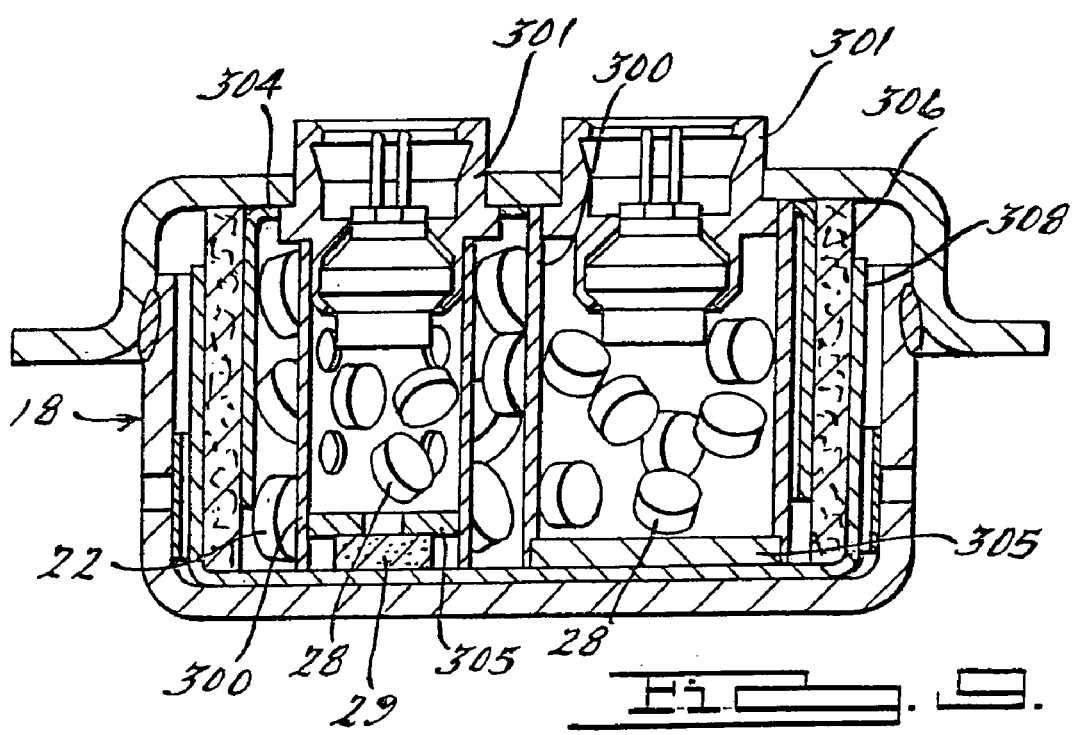
FIG. 9 is another embodiment of the present invention.

FIG. 9 illustrates an inflator formed much like that shown in FIG. 8 except that the inflator has a second chamber welded therein. Again, axial flow and improved manufacturing are exemplified by the design of FIG. 9.

Operation of the inflator will now be discussed with reference to FIGS. 1 and 2.

Upon a crash event, a signal from a crash sensor (not shown) is conveyed to igniter 26, thereby activating booster propellant 28. In the embodiment shown in FIGS. 3 and 4, a signal from the crash sensor may also be conveyed (simultaneously or subsequently) to second igniter 88, thereby activating second igniter 88 and igniting second gas generant 80. Heat from ignition of booster propellant 28 transferred through produces ignition of auto-ignition compound 29, thereby igniting gas generant 22.

In the embodiments shown in FIGS. 1 and 2, inflation gas produced by combustion of gas generants 22 and 80 proceeds radially out through inner baffle openings 61 and 61' and into plenum 65, flowing bidirectionally around either side of inner baffle 60 and also through buffer 68, in the directions indicated by arrows C and D. The inflation gas then exits plenum 65 via outer baffle openings 63 and 63', flowing radially into plenum 64 formed between outer baffle 62 and housing outer wall 18, and flowing in the directions indicated by arrows E and F. Gases then flow through openings 20 and 20' and out of the housing into an associated airbag (not shown). In this embodiment, it may be seen that the inflation gases flow through baffle system circumferentially in directions substantially parallel to a plane perpendicular to inflator longitudinal axis A.

In the embodiment shown in FIG. 5, combustion gases first flow through openings 61 and 61' in inner baffle 60. The gases then migrate upwardly through buffer 68 and then flow through openings 63 and 63' in outer baffle 62. Once past the outer baffle, the gases then flow downwardly toward the housing gas exit openings 20 and 20' and out therethrough for inflation of the associated airbag. In this embodiment, it may be seen that the inflation gases flow through the baffle system substantially parallel to longitudinal axis A.

Figure 10:
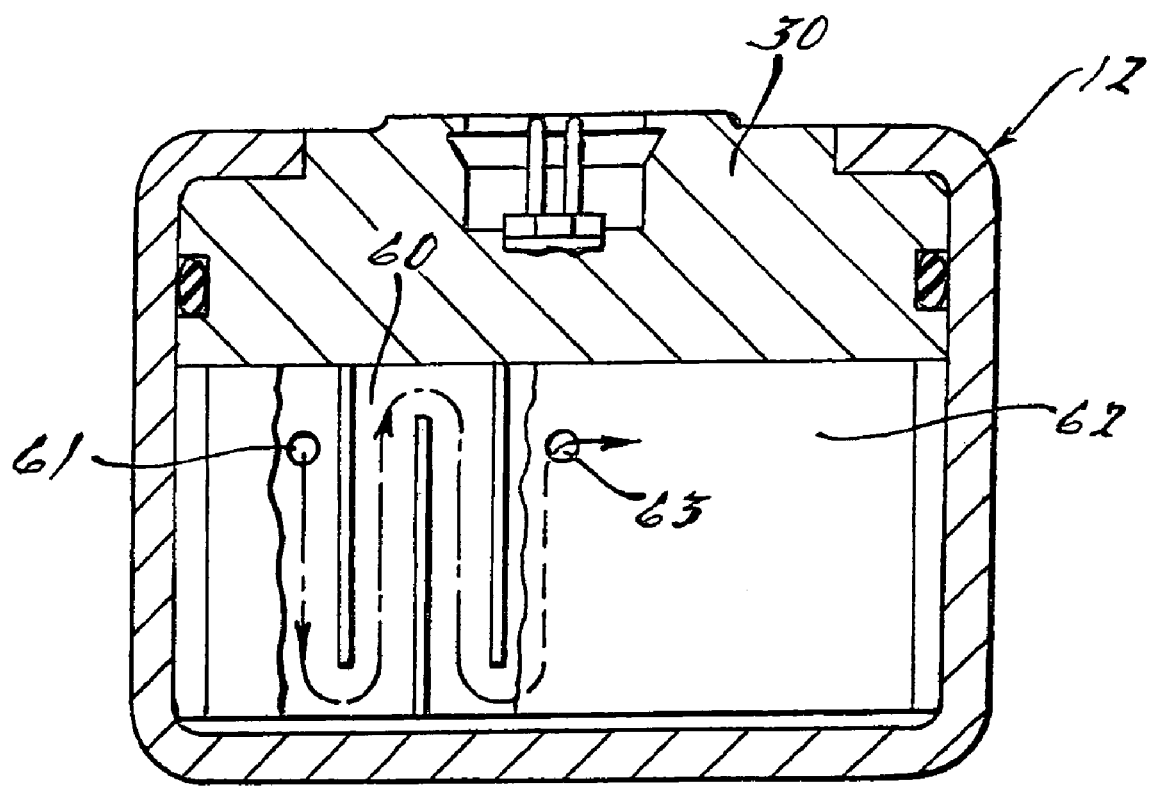
FIG. 10 is a cutaway cross-sectional view of a baffle system in accordance with one embodiment of the present invention.

Referring to FIGS. 1,2, and 10, in yet another alternative embodiment, openings 61, 61' and 63, 63' enabling fluid communication between the baffle system and the exterior of the baffle system, and any openings provided within the baffle system (for example, openings formed in any intermediate baffles positioned between inner baffle 60 and outer baffle 62) are configured to direct the flow of an inflation through the baffle system alternately in directions substantially parallel to a plane perpendicular to longitudinal axis A and substantially parallel to longitudinal axis A.

It is believed that the patterns of circumferential and/or longitudinal fluid flow established by the relative positioning of gas flow openings formed in the inflator components will provide a predetermined degree of cooling of the inflation fluid. By appropriate modification of such factors as the relative gas flow opening locations and the number of baffles used, the degree of fluid cooling may be correspondingly adjusted to meet the cooling requirements of a particular application.

FIG. 6 shows a particular application of an inflator structure in accordance with one of the embodiments described above. Referring to FIG. 6, a baffle system as described above may be incorporated into a driver side airbag module 100. Airbag module 100 comprises a module housing 102 having a rupturable frontal closure 114, an airbag 116, and an inflator 10 in accordance with one of the embodiments previously described. An exemplary inflator construction suitable for use in airbag module 100, absent inner and outer baffles 60 and 62, is described in U.S. Pat. No. 6,422,601, incorporated herein by reference. As described above, inflator housing 12 contains openings 20 and 20' (not shown) in fluid communication with an interior of airbag 116, for effecting discharge of gas produced by gas generants 22 and 80 (not shown).

Referring now to FIG. 7, airbag module 100 or any of the inflator embodiments described above may also be incorporated into a broader, more comprehensive vehicle occupant restraint system 180 including additional elements such as, for example, a safety belt assembly 150. FIG. 7 shows a schematic diagram of one exemplary embodiment of such a restraint system. Airbag module 100 may be in communication with a crash event sensor 210 which is in communication with a known crash sensor algorithm that signals actuation of airbag module 100 via, for example, activation of igniter 26 (FIG. 2) in the event of a collision.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It is believed that the advantages attendant to the inflator formed in accordance with the present invention will translate into similar benefits with regard to the airbag module and with regard to the vehicle occupant restraint system in general. These advantages include, for example, lower gas exit temperatures, manufacturing simplicity, lighter weight, reduced manufacturing cost, simplified assembly, and tailorability of the inflation profile of an associated airbag.

While incorporation of the baffle system and other principles of the invention have been described herein as applied to a driver side inflator, it should be appreciated that passenger side and other inflators such as side impact inflators may be constructed according to the present invention. It will also be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. An inflator for a vehicle occupant protection system, the inflator comprising:
    a cylindrical outer wall having a longitudinal axis and at least one opening formed therealong for enabling fluid communication between an interior of the inflator and an exterior of the inflator;
    a first inflation fluid source positioned within the outer wall;
    a baffle system fluidly interposed between the first inflation fluid source and the outer wall for conveying inflation fluid between the first inflation fluid source and the outer wall;
    at least one opening for enabling fluid communication between the first inflation fluid source and the baffle system; and
    at least one opening for enabling fluid communication between the baffle system and the outer wall,
    the at least one opening for enabling fluid communication between the first inflation fluid source and the baffle system being substantially radially aligned with the at least one opening for enabling fluid communication between an interior of the inflator and an exterior of the inflator,
    the at least one opening for enabling fluid communication between the baffle system and the outer wall being angularly spaced approximately 90° apart from the at least one opening for enabling fluid communication between the first inflation fluid source and the baffle system;
    wherein inflation fluid entering the baffle system from the first inflation fluid source is directed to the at least one opening for enabling fluid communication between the baffle system and the outer wall,
    wherein the at least one opening for enabling fluid communication between the first inflation fluid source and the baffle system, the at least one opening for enabling fluid communication between the baffle system and the outer wall, and the at least one opening for enabling fluid communication between the interior of the inflator and the exterior of the inflator are arranged such that inflation fluid conveyed through the baffle system from the first inflation fluid source to the outer wall flows through the baffle system in directions substantially parallel to a plane perpendicular to the longitudinal axis, and through the baffle system alternately in directions substantially parallel to a plane perpendicular to the longitudinal axis and in directions substantially parallel to the longitudinal axis.

2. The inflator of claim 1 further including another at least one opening for enabling fluid communication between the interior of the inflator and the exterior of the inflator, the other at least one opening being formed along the outer wall substantially diametrically opposite the least one opening formed along the outer wall for enabling fluid communication between the interior of the inflator and the exterior of the inflator.

3. An inflator for a vehicle occupant protection system the inflator comprising:
    a cylindrical outer wall having a longitudinal axis and at least one opening formed therealong for enabling fluid communication between an interior of the inflator and an exterior of the inflator;
    a first inflation fluid source positioned within the outer wall;
    a baffle system fluidly interposed between the first inflation fluid source and the outer wall for conveying inflation fluid between the first inflation fluid source and the outer wall;
    at least one opening for enabling fluid communication between the first inflation fluid source and the baffle system; and
    at least one opening for enabling fluid communication between the baffle system and the outer wall,
    the at least one opening for enabling fluid communication between the first inflation fluid source and the baffle system being substantially radially aligned with the at least one opening for enabling fluid communication between an interior of the inflator and an exterior of the inflator, the at least one opening for enabling fluid communication between the baffle system and the outer wall being angularly spaced approximately 90° apart from the at least one opening for enabling fluid communication between the first inflation fluid source and the baffle system, wherein inflation fluid entering the baffle system from the first inflation fluid source is directed to the at least one opening for enabling fluid communication between the baffle system and the outer wall, wherein the baffle system comprises an outer baffle positioned radially inwardly of the outer wall and in fluid communication with the outer wall and an inner baffle positioned radially inwardly of the outer baffle so as to enable fluid communication between the inflation fluid source and the inner baffle, wherein the at least one opening for enabling fluid communication between the inflation fluid source and the baffle system is formed along the inner baffle, and wherein the inflator further includes;

another at least one opening for enabling fluid communication between the first inflation fluid source and the baffle system, the other at least one opening being formed along the inner baffle substantially diametrically opposite the at least one opening formed along the inner baffle for enabling fluid communication between the first inflation fluid source and the baffle system;

another at least one opening for enabling fluid communication between the baffle system and the outer wall, the other at least one opening being formed along the outer baffle substantially diametrically opposite the at least one opening formed along the outer baffle for enabling fluid communication between the baffle system and the outer wall; and another at least one opening for enabling fluid communication between the interior of the inflator and the exterior of the inflator, the other at least one opening being formed along the outer wall substantially diametrically opposite the at least one opening formed along the outer wall for enabling fluid communication between the interior of the inflator and the exterior of the inflator, and wherein inflation fluid entering the baffle system from the first inflation fluid source is directed to at least one of the at least one opening for enabling fluid communication between the baffle system and the outer wall and the other at least one opening for enabling fluid communication between the baffle system and the outer wall.

4. The inflator of claim 3 wherein the inner baffle and the outer baffle are substantially concentrically arranged about the longitudinal axis.

5. The inflator of claim 3 wherein the at least one opening for enabling fluid communication between the baffle system and the outer wall is formed along the outer baffle.

6. The inflator of claim 3 further comprising a buffer positioned between the inner baffle and the outer baffle for cooling inflation fluid flowing between the inner and outer baffles.

7. The inflator of claim 6 wherein the buffer comprises an expanded metal mesh.

8. An inflator for a vehicle occupant protection system, the inflator comprising:

a cylindrical outer wall having a longitudinal axis and at least one opening formed therealong for enabling fluid communication between an interior of the inflator and an exterior of the inflator;

a first inflation fluid source positioned within the outer wall;

a baffle system fluidly interposed between the first inflation fluid source and the outer wall for conveying inflation fluid between the first inflation fluid source and the outer wall;

at least one opening for enabling fluid communication between the first inflation fluid source and the baffle system; and at least one opening for enabling fluid communication between the baffle system and the outer wall, the at least one opening for enabling fluid communication between the first inflation fluid source and the baffle system being substantially radially aligned with the at least one opening for enabling fluid communication between an interior of the inflator and an exterior of the inflator, the at least one opening for enabling fluid communication between the baffle system and the outer wall being angularly spaced approximately 90° apart from the at least one opening for enabling fluid communication between the first inflation fluid source and the baffle system, wherein inflation fluid entering the baffle system from the first inflation fluid source is directed to the at least one opening for enabling fluid communication between the baffle system and the outer wall, the inflator further including a second inflation fluid source positioned within the outer wall in fluid isolation from the first inflation fluid source, and wherein the baffle system is fluidly interposed between the second inflation fluid source and the outer wall for conveying inflation fluid between the second inflation fluid source and the outer wall.

9. The inflator of claim 8 wherein the second inflation fluid source comprises a quantity of a gas generant composition.

10. The inflator of claim 9 wherein the gas generant composition comprises a smokeless gas generant composition.

11. The inflator of claim 9 wherein the second inflation fluid source is fluidly isolated from the first inflation fluid source by a barrier configured for preventing sympathetic ignition of the second gas generant composition in response to ignition of the first gas generant composition, and for enabling release of inflation gas into the baffle system upon ignition of the second gas generant composition.

* * * * *